3,458,417
PREPARATION OF CARBON PARTICLES ELECTROHYDRAULICALLY
Merton Allen and Jack Deiber, Schenectady, N.Y., assignors to General Electric Company, a corporation of New York
No Drawing. Filed Jan. 24, 1966, Ser. No. 522,360
Int. Cl. C07c 3/24; B01j 1/72
U.S. Cl. 204—173  6 Claims

ABSTRACT OF THE DISCLOSURE

A process is disclosed for making pigments of carbon and carbonaceous material from a liquid which is composed of a thermally decomposable organic material which may contain water. A capacitative spark discharge of an energy level of several hundred joules or more between spaced electrodes submerged in the liquid decomposes the liquid organic material to produce the carbon particles while the steep, high energy shock wave which is also produced by the discharge breaks down the particles to produce the suspension. The suspensoid is useful in printing inks and the like.

---

This invention relates to electrohydraulics and more particularly to an electrohydraulic method for producing liquid organics containing a finely-divided black carbonaceous dispersion.

Conventionally, various types of liquid vehicles have been mixed with black pigmenting substances such as carbon black, graphite, lampblack, etc. for various purposes. For example, a colloidal suspension of carbon in mineral oil has been used as printing ink while similar pigmenting materials have been used in other vehicles to produce paints, conductive coatings for electrical resistance applications, as well as other diverse applications. Normally, the dry black pigment is mixed in predetermined proportions with a vehicle such as drying oil, petroleum oil, lacquer and various types of resins and milled until the proper suspension is obtained. The milling which is accomplished by standard techniques, for example ball or rod milling, may require times ranging from several hours to several days before the proper suspension is obtained.

It is a principal object of this invention to provide an improved process for producing a finely-divided black carbonaceous particle dispersion in various types of liquid organic vehicles.

It is another object of this invention to provide an improved process wherein a black pigmenting dispersion is formed in situ in liquid organics.

It is another object of this invention to provide an improved process for producing black pigmented organic liquids more efficiently and quickly than has heretofore been possible.

Other objects and advantages of this invention will be in part obvious and in part explained by reference to the accompanying specification.

Very broadly, the present process is one in which a liquid organic vehicle is placed within or is in continuous flow through a suitable container and a pair of electrodes located within the liquid so that the operating surfaces of the electrodes are separated by the organic liquid. A differential in electrical potential between the electrodes is established and this differential is made of a magnitude sufficient to insure that an electrical breakdown and conducting path is created between the electrodes. The differential in potential is maintained giving rise to electrical conduction until electric arcing occurs between the electrodes and a shock wave is generated within the liquid.

The combined effect of the electrical breakdown, arcing, and shock wave propagation is to chemically decompose a portion of the organic liquid forming a gas and the fine carbonaceous deposit which is initially located primarily between the electrode poles. When shock wave is propagated by creation of the electric arc, the particles are dispersed from the area between the poles out and through the remainder of the organic liquid. The shock wave also causes the particles to be comminuted to a small size.

Considering the process in more detail, a suitable organic liquid which contains carbon in chemically combined form capable of being chemically decomposed, is placed within a closed vessel from which gas can be discharged. Any organic liquid or organic liquid solution which contains carbon in a chemically decomposable form is suitable for use in the process. The pure organic may be used or it may be preferred in some situations to mix the organic with water or a water solution. Single or multiple liquid phases can be used. Mixtures of organic liquids can be used. Material such as drying oil, mineral oil, lacquer, resins, or, for that matter, any liquid hydrocarbon is suitable. On the other hand, monomers of materials such as vinyl chloride, polyvinyl alcohol, etc. can be used where it is desired to subsequently polymerize the material and produce a substance having a particle dispersion of carbonaceous material.

Once the organic liquid has been suitably located within a container, at least a pair of electrodes are immersed within the organic liquid in a manner such that an operating gap is present between the electrically conducting surfaces of the electrodes. The electrodes are connected to a suitable source of power which, in most cases, is a capacitor bank capable of delivering large quantities of energy to the electrodes in comparatively short time periods and on a quickly repeating basis. The establishment of a differential in electric potential between the opposed electrodes results in an electrical breakdown of a portion of the organic liquid located between the electrodes and this in turn forms an electrically conducting path. At this stage there is some decomposition of the organic liquid forming a gas and a carbonaceous deposit which may be pure carbon or more often carbon with some reduced carbon compound. By continuing the potential differential, an arc is created which travels along the conducting path between the electrodes and this arc results in further formation of carbonaceous deposit and also causes propagation of the shock wave or pressure gradient which travels from the arcing site throughout the organic liquid.

Since the electrical breakdown path and the electric arcing occurred solely between the electrode working faces, it is apparent that the chemical decomposition of organic liquid forming the carbonaceous deposit occurred within a very restricted area. Therefore, the creation of the shock wave is valuable in breaking up the comparatively well-defined region within which the carbonaceous deposit is located and dispersing it into the remainder of the organic liquid. The shock wave also acts to break up the formed particles into smaller sized particles for ease in dispersion. By repeatedly establishing the differential in potential, electrical breakdown and arc discharging, more and more carbonaceous deposit can be formed in situ and the operation becomes progressively easier in terms of power requirements because electrode gap arcing becomes easier as the concentration of electrically conducting carbonaceous solids within the liquid becomes greater.

To test the efficacy of the process, 500 discharges at 730 joules of energy per discharge were effected into 1.2 liters of mineral oil. This represented an operating condition of 18 microfarads at 7.75 kv. The result was the production of two percent by weight of a dispersed black pigment which infrared spectrum tests indicated to be essentially carbon. This result represents the production of one pound of solids for each five kw.-hr. of electrical energy which represents a production cost about one-fifth that of commercial carbon black of a quality used for printing inks. Utilizing this process in mineral oil is a very effective way for producing printing ink at substantially lower costs and of better quality than has previously been commercially available. By way of comparison, the conventional milling of carbon black into mineral oil to form printer's ink produces a "yellow-black" ink whereas use of the present process results in a "blue-black" ink, the latter ink being a much more desirable ink than the former.

The process was also carried out on the organic liquids and the mixtures listed below in the table.

TABLE

| Material | Organic (ml.) | Water (ml.) |
| --- | --- | --- |
| Ultra high purity mineral oil | 2,250 | 250 |
| Do | 2,250 | 0 |
| Benzene | 500 | 4,000 |
| Do | 2,250 | 250 |
| Do | 2,250 | 0 |
| Crude oil | 2,250 | 250 |
| Do | 2,250 | 0 |
| Ethyl alcohol | 2,250 | 250 |
| Do | 2,250 | 0 |

The carbonaceous deposits were formed in all of these materials and the evolution of gas was noted which is indicative of chemical decomposition. The gas formation from electrohydraulic discharge in pure hydrocarbon is essentially hydrogen with traces of oxides of carbon.

Successful tests were also run on mixtures of vegetable oil and acetic acid solution, benzene and ammonium hydrixode solution, benzene and nitric acid solution, mineral oil and a 10 percent ammonium hydroxide solution and vegetable oil mixed solely with water. Analysis of the results of these tests showed the carbonaceous deposit to be largely but not totally carbon.

While it has been pointed out that the present process will work with various types of hydrocarbons, the invention also has application in connection with monomeric and polymeric materials which can later be polymerized, reacted or dried by conventional means to form polymeric bodies having various electrically conducting characteristics. For example, an electric resistor could be constructed by forming a carbonaceous deposit in monomeric vinyl chloride, coating a non-conducting substrate with the carbonized monomer and then polymerizing to form a stable film capable of subsequent electrical application, or a partially polymerized phenolic in a suitable solvent can be treated to form a carbonaceous deposit, coated on a non-conducting substrate and subsequently dried by solvent evaporation and fully polymerized to form a stable film capable of subsequent electrical application.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What we claim as new and desire to secure by Letters Patent of the United States is:

1. A process for forming pigments of carbon and carbonaceous material in a liquid consisting essentially of a particle-free, predominantly carbon-containing organic liquid which is capable of being decomposed to form carbon and carbonaceous material particles comprising the steps of submerging at least one pair of spaced electrodes in a body of said liquid, producing an arc by a capacitative discharge between said electrodes in said liquid at an energy level of several hundred joules to cause said decomposition of said organic to form said particles and substantially simultaneously generate a high energy shock which comminutes the particles to colloidal dimensions, separating and recovering substantially all of said particles from said liquid and preparing said particles for use as a pigment.

2. A process as defined in claim 1 wherein the arcing between the oposed electrodes is repeated rapidly to increase the rate of formation of solid carbonaceous deposit in organic liquid remaining.

3. The process as defined in claim 1 wherein the organic liquid is a hydrocarbon.

4. A process as defined in claim 1 wherein the hydrocarbon is mineral oil.

5. A process as defined in claim 1 wherein the liquid is an organic monomer.

6. A process as defined in claim 1 wherein the liquid is an organic polymer.

References Cited

UNITED STATES PATENTS 3,169,915  2/1965  Kennedy _____ 204—171

ROBERT K. MIHALEK, Primary Examiner

U.S. Cl. X.R.

204—168